United States Patent
Ogawa et al.

(10) Patent No.: US 11,980,189 B2
(45) Date of Patent: *May 14, 2024

(54) AGRICULTURAL FORMULATIONS, USES THEREOF AND PROCESSES FOR PREPARATION THEREOF

(71) Applicant: Valent U.S.A. LLC, San Ramon, CA (US)

(72) Inventors: Toshiya Ogawa, San Ramon, CA (US); Ke Zhou, San Ramon, CA (US); Jessica Tanuwidjaja, Fremont, CA (US); Jane Liu, Milpitas, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/472,864

(22) Filed: Sep. 13, 2021

(65) Prior Publication Data

US 2022/0079154 A1    Mar. 17, 2022

Related U.S. Application Data

(60) Provisional application No. 63/077,916, filed on Sep. 14, 2020.

(51) Int. Cl.
| | |
|---|---|
| *A01N 43/56* | (2006.01) |
| *A01N 25/04* | (2006.01) |
| *A01N 25/10* | (2006.01) |
| *A01N 37/18* | (2006.01) |
| *A01N 37/46* | (2006.01) |
| *A01N 43/78* | (2006.01) |
| *A01P 3/00* | (2006.01) |

(52) U.S. Cl.
CPC ............. *A01N 43/56* (2013.01); *A01N 25/04* (2013.01); *A01N 25/10* (2013.01); *A01N 37/18* (2013.01); *A01N 37/46* (2013.01); *A01N 43/78* (2013.01); *A01P 3/00* (2021.08)

(58) Field of Classification Search
CPC ........ A01N 25/00; A01N 25/04; A01N 25/10; A01N 37/18; A01N 37/46; A01N 37/50; A01N 43/56; A01N 43/78; A01P 3/00
See application file for complete search history.

(56) References Cited

U.S. PATENT DOCUMENTS

2019/0380332 A1 * 12/2019 Steinbrenner .......... A01N 25/28

FOREIGN PATENT DOCUMENTS

| WO | WO-2019161161 A1 * | 8/2019 | ............. A01N 25/04 |
| WO | WO-2020224942 A1 * | 11/2020 | ............. A01N 25/02 |

* cited by examiner

*Primary Examiner* — Umamaheswari Ramachandran
(74) *Attorney, Agent, or Firm* — Wood, Phillips, Katz, Clark & Mortimer

(57) ABSTRACT

The present invention is generally related to an agricultural formulation comprising 3-(difluoromethyl)-1-methyl-N-[(3R)-1,1,3-trimethyl-2,3-dihydroinden-4-yl]pyrazole-4-carboxamide and sodium salt of naphthalene sulfonate condensate and polyoxyethylene tristyrylphenol phosphate, potassium salt. The present invention is further related to an agricultural formulation comprising 3-(difluoromethyl)-1-methyl-N-[(3R)-1,1,3-trimethyl-2,3-dihydroinden-4-yl]pyrazole-4-carboxamide, ethaboxam, metalaxyl, mandestrobin, methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt. The present invention is further directed to a process for preparing the agricultural formulations and methods of use thereof.

6 Claims, No Drawings

AGRICULTURAL FORMULATIONS, USES THEREOF AND PROCESSES FOR PREPARATION THEREOF

FIELD OF THE INVENTION

The present invention is generally related to an agricultural formulation comprising 3-(difluoromethyl)-1-methyl-N-[(3R)-1,1,3-trimethyl-2,3-dihydroinden-4-yl]pyrazole-4-carboxamide and sodium salt of naphthalene sulfonate condensate and polyoxyethylene tristyrylphenol phosphate, potassium salt. The present invention is further related to an agricultural formulation comprising 3-(difluoromethyl)-1-methyl-N-[(3R)-1,1,3-trimethyl-2,3-dihydroinden-4-yl] pyrazole-4-carboxamide, ethaboxam, metalaxyl, mandestrobin, methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt. The present invention is further directed to a process for preparing the agricultural formulations and methods of use thereof.

BACKGROUND OF THE INVENTION

Fungal infections are a major concern for crop growers. Fungi can be present on the seed surface prior to planting, they can be soil-borne, or they can be introduced into the growing environment by mobile pests or equipment. Fungi infect seeds and seedlings and destroy plant cells and tissues and thereby prevent seed germination or cause poor development or death of seedlings. *Aphanomyces, Fusarium, Helminthosporium, Pythium,* and *Rhizoctonia* are all known to cause infection and death of plants. These organisms cause seed rot, damping-off, seed blight, and root rot. Even diseases that affect adult plants can be controlled by pesticidal seed treatments (e.g., smuts caused by *Ustilago, Tilletia,* and *Urocystis*).

Metalaxyl is a widely used fungicide for controlling diseases among crops. Metalaxyl is the active ingredient in the seed treatment marketed as Sebring® 318 FS (Sebring is a registered trademark of and available from Nufarm Americas Inc) and Allegiance® FL. However, metalaxyl presents many formulations challenges including its low melting point (63-72° C.) and partial water solubility (8,400 parts per million). Liquid formulations of metalaxyl often form large crystals upon storage. Further, due to its low melting point, formulating metalaxyl with other low-melting point pesticides is highly problematic. To date there is no known finely milled aqueous slurry of metalaxyl and another low-melting point pesticide.

Inpyrfluxam (i.e. S-2399; 3-(difluoromethyl)-1-methyl-N-[(3R)-1,1,3-trimethyl-2,3-dihydroinden-4-yl]pyrazole-4-carboxamide) is a novel succinate dehydrogenase inhibitor fungicide. Inpyrfluxam presents many formulations challenges including its low co-melting point with metalaxyl (less than 50° C.) and crystal formation in liquid formulations upon storage.

There remains a need in the art for physically and chemically stable formulations containing inpyrfluxam and other low-melting point pesticides useful for seed treatment that provides improved protection against fungal pests. Further, there is a need in the art for a process to prepare such physically and chemically stable formulations containing inpyrfluxam and other low-melting point pesticides.

SUMMARY OF THE INVENTION

The present invention is directed to an agricultural formulation comprising 3-(difluoromethyl)-1-methyl-N-[(3R)-1,1,3-trimethyl-2,3-dihydroinden-4-yl]pyrazole-4-carboxamide, sodium salt of naphthalene sulfonate condensate and polyoxyethylene tristyrylphenol phosphate, potassium salt.

The present invention is further directed to an agricultural formulation comprising 3-(difluoromethyl)-1-methyl-N-[(3R)-1,1,3-trimethyl-2,3-dihydroinden-4-yl]pyrazole-4-carboxamide, ethaboxam, metalaxyl, mandestrobin, methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt.

The present invention is further directed to a process for preparing an agricultural formulation comprising 3-(difluoromethyl)-1-methyl-N-[(3R)-1,1,3-trimethyl-2,3-dihydroinden-4-yl]pyrazole-4-carboxamide, ethaboxam, metalaxyl and mandestrobin, comprising the steps of: adding 3-(difluoromethyl)-1-methyl-N-[(3R)-1,1,3-trimethyl-2,3-dihydroinden-4-yl]pyrazole-4-carboxamide to a first excipient formulation comprising a sodium salt of naphthalene sulfonate condensate and polyoxyethylene tristyrylphenol phosphate, potassium salt, to create a 3-(difluoromethyl)-1-methyl-N-[(3R)-1,1,3-trimethyl-2,3-dihydroinden-4-yl] pyrazole-4-carboxamide formulation;

adding metalaxyl to propylene glycol at a temperature from about 20 to about 70° C. and stirring to create a metalaxyl solution;

adding the metalaxyl solution, ethaboxam and mandestrobin to a second excipient formulation comprising methyloxirane polymer, a sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt, to create a ethaboxam, mandestrobin and metalaxyl formulation; and adding the 3-(difluoromethyl)-1-methyl-N-[(3R)-1,1,3-trimethyl-2,3-dihydroinden-4-yl]pyrazole-4-carboxamide formulation to the ethaboxam, mandestrobin and metalaxyl formulation to create the agricultural formulation.

The present invention is further directed to a method of protecting plants comprising treating plant propagation material with a fungicidally effective amount of an agricultural formulation of the present invention.

The present invention is further directed to a method for controlling or preventing pest damage of plants comprising applying to the plant propagation material an effective amount of an agricultural formulation of the present invention onto a plant propagation material.

DETAILED DESCRIPTION OF THE INVENTION

Milling 3-(difluoromethyl)-1-methyl-N-[(3R)-1,1,3-trimethyl-2,3-dihydroinden-4-yl]pyrazole-4-carboxamide, ethaboxam, metalaxyl and mandestrobin together causes crystal growth. Applicant unexpectedly found that formulating 3-(difluoromethyl)-1-methyl-N-[(3R)-1,1,3-trimethyl-2,3-dihydroinden-4-yl]pyrazole-4-carboxamide separate from a formulation containing ethaboxam, metalaxyl and mandestrobin and the mixing the two formulations provide a physically stable formulation. Specifically, the Applicant has unexpectedly discovered a stable agricultural formulation comprising 3-(difluoromethyl)-1-methyl-N-[(3R)-1,1,3-trimethyl-2,3-dihydroinden-4-yl]pyrazole-4-carboxamide and sodium salt of naphthalene sulfonate condensate and polyoxyethylene tristyrylphenol phosphate, potassium salt. The Applicant has further discovered a stable agricultural formulation comprising 3-(difluoromethyl)-1-methyl-N-[(3R)-1,1,3-trimethyl-2,3-dihydroinden-4-yl]pyrazole-4-carboxamide, ethaboxam, metalaxyl, mandestrobin, methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt. The Applicant has further discovered a process by which these agricultural formulations can be made. A stable agricultural formulation comprising 3-(difluoromethyl)-1-methyl-N-[(3R)-1,1,3-trimethyl-2,3-dihydroinden-4-yl]pyrazole-4-carboxamide is unexpected because crystal and/or particle size growth normally occurs with this compound. A stable agricultural formulation comprising 3-(difluoromethyl)-1-methyl-N-[(3R)-1,1,3-trimethyl-2,3-dihydroinden-4-yl]pyrazole-4-carboxamide, ethaboxam, metalaxyl and mandestrobin is unexpected because of the co-melting that occurs between 3-(difluoromethyl)-1-methyl-N-[(3R)-1,1,3-trimethyl-2,3-dihydroinden-4-yl]pyrazole-4-carboxamide, metalaxyl and other actives. As previously mentioned, stable formulations containing 3-(difluoromethyl)-1-methyl-N-[(3R)-1,1,3-trimethyl-2,3-dihydroinden-4-yl]pyrazole-4-carboxamide or metalaxyl are difficult to obtain because undesirable crystals form. Applicants unexpectedly found that processes and formulations of the present invention provide a superior solution to this known problem in the art. In one embodiment, the present invention is directed to an agricultural formulation comprising a compound selected from the group consisting of 3-(difluoromethyl)-1-methyl-N-[(3R)-1,1,3-trimethyl-2,3-dihydroinden-4-yl]pyrazole-4-carboxamide at a concentration from about 1% to about 50% w/w, preferably from about 20% to about 40% w/w, even more preferably at about 34% w/w, sodium salt of naphthalene sulfonate condensate at a concentration from about 0.1% to about 10% w/w, preferably from about 0.1% to about 2% w/w, more preferably from about 1% to about 2% w/w and even more preferably at about 1.25% w/w and polyoxyethylene tristyrylphenol phosphate, potassium salt at a concentration from about 0.1% to about 5% w/w, preferably from about 0.11% to about 2% w/w, more preferably from about 0.2% to about 1% w/w and even more preferably at about 0.65% w/w.

In another embodiment, the present invention is directed to an agricultural formulation comprising a compound selected from the group consisting of 3-(difluoromethyl)-1-methyl-N-[(3R)-1,1,3-trimethyl-2,3-dihydroinden-4-yl]pyrazole-4-carboxamide, ethaboxam, metalaxyl, mandestrobin, methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt, wherein the concentration ratio of methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt is from about 1:10:1:10 to about 1:100:1:100, preferably from about 1:10:1:10 to about 1:50:1:50 and preferably at about 1:20:1:47.

In another embodiment, the present invention is directed to an agricultural formulation comprising a compound selected from the group consisting of 3-(difluoromethyl)-1-methyl-N-[(3R)-1,1,3-trimethyl-2,3-dihydroinden-4-yl]pyrazole-4-carboxamide at a concentration from about 1% to about 10% w/w, preferably from about 1% to about 5% w/w, even more preferably from about 1% to about 2% w/w and most preferably at about 1.5% w/w, ethaboxam at a concentration from about 1% to about 10% w/w, preferably from about 1% to about 5% w/w, even more preferably from about 2% to about 3% w/w and most preferably at about 2.2% w/w, metalaxyl at a concentration from about 1% to about 10% w/w, preferably from about 1% to about 5% w/w, even more preferably from about 1% to about 2% w/w and most preferably at about 1.2% w/w, mandestrobin at a concentration from about 1% to about 10% w/w, preferably from about 1% to about 5% w/w, even more preferably from about 2% to about 3% w/w and most preferably at about 3% w/w, methyloxirane polymer at a concentration from about 0.01% to about 5% w/w, preferably from about 0.02% to about 1% w/w, even more preferably from about 0.05% to about 0.07% w/w and most preferably at about 0.06% w/w, sodium salt of naphthalene sulfonate condensate at a concentration from about 0.1% to about 10% w/w, preferably from about 1% to about 5% w/w, even more preferably from about 1% to about 2% w/w and most preferably at about 1.3% w/w, a mixture of sodium salt of alkyl vinyl ether/maleic acid half-ester copolymer and polyvinyl pyrrolidone at a concentration from about 0.01% to about 5% w/w, preferably from about 0.02% to about 1% w/w, even more preferably from about 0.05% to about 0.07% w/w and most preferably at about 0.06% w/w and polyoxyethylene tristyrylphenol phosphate, potassium salt at a concentration from about 0.1% to about 10% w/w, preferably from about 1% to about 5% w/w, even more preferably from about 2% to about 3% w/w and most preferably at about 2.9% w/w.

Compositions of the present invention may further comprise one or more excipients selected from the group consisting of propylene glycol, preferably at a concentration from about 10% to about 50% w/w, more preferably from about 20% to about 40% w/w and even more preferably at about 33% w/w, 25% carnauba wax emulsion, preferably at a concentration from about 1% to about 10% w/w, more preferably from about 2% to about 3% w/w and even more preferably at about 2.4% w/w, a silicone emulsion, preferably at a concentration from about 0.0001% to about 5% w/w, more preferably from about 0.02% to about 0.03% w/w or from about 2% to about 3% w/w and even more preferably at about 0.025% w/w or about 2.4% w/w, xanthan gum, preferably at a concentration from about 0.01% to about 1% w/w, more preferably from about 0.1% to about 0.4% w/w and even more preferably at about 0.16% or about 0.29% w/w, 1,2-benzisothiazolin-3-one prepared at a concentration of 19.3%, preferably at a concentration from about 0.01% to about 1% w/w, more preferably from about 0.2% to about 0.3% w/w and even more preferably at about 0.24% w/w, ethylene-vinyl acetate copolymer in water, preferably at a concentration from about 0.01% to about 10% w/w, more preferably from about 0.1% to about 0.2% w/w or from about 2% to about 4% w/w and even more preferably at about 0.13% w/w or about 3% w/w, 24% polyvinyl alcohol solution, preferably at a concentration from about 0.01% to about 5% w/w, more preferably from about 0.08% to about 0.1% w/w or from about 1% to about 3% w/w and even more preferably at about 0.09% w/w or about 2% w/w, glycerol, preferably at a concentration from about 0.01% to about 20% w/w, more preferably from about 0.3% to about 0.4% w/w or from about 1% to about 10% w/w and even more preferably at about 0.35% w/w or about 8% w/w, 70% sorbitol solution, preferably at a concentration from about 0.01% to about 10% w/w, more preferably from about 0.2% to about 0.3% w/w or from about 2% to about 7% w/w and even more preferably at about 0.23% w/w or about 5.25% w/w, a defoamer, preferably at a concentration from about 0.00001% to about 0.1% w/w, more preferably from about 0.002% to about 0.004% w/w or from about 0.05% to about 0.07% w/w and even more preferably at about 0.003% w/w or about 0.065%, and a colorant, preferably at a concentration from about 1% to 10% w/w more preferably from about 6% to about 8% w/w and even more preferably at about 7% w/w.

In another embodiment, the present invention is further directed to an agricultural formulation comprising:
about 34.05% w/w 3-(difluoromethyl)-1-methyl-N-[(3R)-1,1,3-trimethyl-2,3-dihydroinden-4-yl]pyrazole-4-carboxamide;
about 2% w/w of a 24% polyvinyl alcohol solution;
about 8% w/w glycerol;
about 5.25% w/w of a 70% sorbitol solution;
about 1.25% w/w sodium salt of naphthalene sulfonate condensate;
about 0.65% w/w polyoxyethylene tristyrylphenol phosphate, potassium salt;
about 0.065% w/w of a defoamer;
about 2.4% w/w of a 25% carnauba wax emulsion;
about 3% w/w of an ethylene-vinyl acetate copolymer in water;
about 0.16% w/w xanthan gum;
about 0.24% w/w 19.3% 1,2-benzisothiazolin-3-one; and
about 42.935% w/w water.

In another embodiment, the present invention is further directed to an agricultural formulation comprising:
about 34.05% w/w 3-(difluoromethyl)-1-methyl-N-[(3R)-1,1,3-trimethyl-2,3-dihydroinden-4-yl]pyrazole-4-carboxamide;
about 8% w/w glycerol;
about 5.25% w/w of a 70% sorbitol solution;
about 1.25% w/w sodium salt of naphthalene sulfonate condensate;
about 0.65% w/w polyoxyethylene tristyrylphenol phosphate, potassium salt;
about 0.065% w/w of a defoamer;
about 2.4% w/w of a 25% carnauba wax emulsion;
about 3% w/w of an ethylene-vinyl acetate copolymer in water;
about 0.18% w/w xanthan gum;
about 0.24% w/w 19.3% 1,2-benzisothiazolin-3-one; and
about 44.914% w/w water.

In another embodiment, the present invention is further directed to an agricultural formulation comprising:
about 1.502% w/w 3-(difluoromethyl)-1-methyl-N-[(3R)-1,1,3-trimethyl-2,3-dihydroinden-4-yl]pyrazole-4-carboxamide;
about 2.246% w/w ethaboxam;
about 1.195% w/w metalaxyl;
about 2.992% w/w mandestrobin;
about 0.088% w/w of a 24% polyvinyl alcohol solution;
about 0.353% w/w glycerol;
about 0.232% w/w of a 70% sorbitol solution;
about 0.062% w/w methyloxirane polymer;
about 1.261% w/w sodium salt of naphthalene sulfonate condensate;
about 0.062% w/w of a mixture of sodium salt of alkyl vinyl ether/maleic acid half-ester copolymer and polyvinyl pyrrolidone;
about 2.896% w/w polyoxyethylene tristyrylphenol phosphate, potassium salt;
about 0.003% w/w of a defoamer;
about 0.132% w/w of an ethylene-vinyl acetate copolymer in water;
about 2.39% w/w of a 25% carnauba wax emulsion;
about 0.025% w/w silicone emulsion;
about 0.294% w/w xanthan gum;
about 0.24% w/w of 19.3% 1,2-benzisothiazolin-3-one;
about 32.539% w/w propylene glycol; and
about 44.481% w/w water.

In another embodiment, the present invention is further directed to a method of protecting plants comprising treating plant propagation material with a fungicidally effective amount of an agricultural formulation of the present invention.

In another embodiment, the present invention is further directed to a method for controlling or preventing pest damage of plants comprising applying to the plant propagation material an effective amount of an agricultural formulation of the present invention onto a plant propagation material.

As used herein, "plant propagation material" refers to seeds, bulbs, rhizomes and tubers.

In a preferred embodiment, the plant propagation material is a seed. In a more preferred embodiment, the formulations of the present invention are applied to the seeds before they are planted.

In another preferred embodiment, the plant that is treated is a crop plant. In a more preferred embodiment, the crop plant is selected from the group consisting of corn, soybeans, beans, peas, lentils, flax, wheat, rice, canola, sorghum, barley, oats, rye, millet and sugar beets.

The phrase "effective amount" of the formulation means a sufficient amount of the formulation to provide the desired effect. In general, the formulation is employed in amounts that do not inhibit germination of the seeds (or cause phytotoxic damage to the seeds) while providing adequate pest control. Pest control can mean reducing pest damage to the plant, reducing the amount of pests on the plant or in its immediate environment, or preventing the pests from reproducing, among other things. The amount of the formulation may vary depending on specific crops and other factors. It is well within the ordinary skill in the art to determine the necessary amount of the formulation.

As used herein, "pest" refers to pathogens and parasites that negatively affect the host plants by colonizing, attacking, irritating, or feeding upon them, or competing for nutrients with the host. A pest may be, for example, an undesirable bacterium, fungus including fungal pathogens, or insect.

Fungal pathogens include but are not limited to *Rhizoctonia, Fusarium, Pythium Phytophthora, Phomopsis*, and seed decay fungi including *Aspergillus, Penicillium, Alternaria, Rhizopus*, and Basidiomycete bunt and smut fungi.

As used herein, "plant" and "plants" refer to wild type and genetically modified members of the plant kingdom, including higher (vascular) plants and lower (non-vascular) plants.

As used herein, "crop plants" refers to cereal, legumes, forage crops, stem and leaf crops, tuber, bulb and root crops, fruit and seed vegetables, fruit and nut crops, beverage crops, oil, fat and wax crops, spices, perfumes and flavorings, and ornamentals, forest and fiber crops.

The formulations of the present invention may be applied simultaneous or sequentially to the areas in need of treatment.

The formulations of the present invention can be applied to any environment in need of pest control. The environment in need of pest control may include any area that is desired to have a reduced number of pests or to be free of pests. For example, the pesticide can be applied to areas where crop plants are grown.

As used herein, "controlling or preventing pest damage in a growing plant" refers to maintaining the population of the target pest at a rate per plant such that the plant is viable and produces an agriculturally useful product.

As used herein, all numerical values relating to amounts, weights, and the like, that are defined as "about" each particular value is plus or minus 10%. For example, the phrase "about 10% w/w" is to be understood as "9% w/w to 11% w/w." Therefore, amounts within 10% of the claimed value are encompassed by the scope of the claims.

As used herein "% w/w" and "percent w/w" refer to the percent weight of the total formulation.

The disclosed embodiments are simply exemplary embodiments of the inventive concepts disclosed herein and should not be considered as limiting, unless the claims expressly state otherwise.

The following examples are intended to illustrate the present invention and to teach one of ordinary skill in the art how to use the formulations of the invention. They are not intended to be limiting in any way.

EXAMPLES

Example 1—Stability of 3-(difluoromethyl)-1-methyl-N-[(3R)-1,1,3-trimethyl-2,3-dihydroinden-4-yl]pyrazole-4-carboxamide formulations

TABLE 1

| % w/w | I1 | I2 | I3 | I4 | I5 | I6 | I7 | I8 |
|---|---|---|---|---|---|---|---|---|
| 3-(difluoromethyl)-1-methyl-N-[(3R)-1,1,3-trimethyl-2,3-dihydroinden-4-yl]pyrazole-4-carboxamide | 38.4 | 38.4 | 38.4 | 38.4 | 38.4 | 38.4 | 38.4 | 38.4 |
| Xanthan gum | 0.12 | 0.12 | 0.12 | 0.12 | 0.12 | 0.12 | 0.15 | 0.18 |
| A 1.15% 5-chloro-2-methyl-4-isothiazolin-3-one and 0.35% 2-methyl-4-isothiazolin-3 one solution in-water | 0.06 | 0.06 | 0.06 | 0.06 | 0.06 | 0.06 | 0.075 | 0.09 |
| 24% polyvinyl alcohol solution | 4.8 | 4.8 | 4.8 | 4.8 | 4.8 | 4.8 | 4.8 | 4.8 |
| Glycerol | 3.7 | 3.7 | 3.7 | 3.7 | 3.7 | 3.7 | 3.7 | 3.7 |
| 70% Sorbitol Solution | 5.25 | 5.25 | 5.25 | 5.25 | 5.25 | 5.25 | 5.25 | 5.25 |
| 35% graft copolymer | 1.8 | — | — | — | — | — | — | — |
| Sodium salt of naphthalene sulfonate condensate | — | 1 | 1.25 | 1.5 | 1.75 | 2 | 2 | 2 |
| Polyoxyethylene tristyrylphenol phosphate, potassium salt | 0.65 | 0.65 | 0.65 | 0.65 | 0.65 | 0.65 | 0.65 | 0.65 |
| Defoamer | 0.065 | 0.065 | 0.065 | 0.065 | 0.065 | 0.065 | 0.065 | 0.065 |
| 25% Carnauba wax emulsion | 2.4 | 2.4 | 2.4 | 2.4 | 2.4 | 2.4 | 2.4 | 2.4 |
| Vinyl acetate ethylene copolymer emulsion | 3 | 3 | 3 | 3 | 3 | 3 | 3 | 3 |
| Water | 39.755 | 40.555 | 40.305 | 40.055 | 39.805 | 39.555 | 39.51 | 39.465 |
| Total | 100 | 100 | 100 | 100 | 100 | 100 | 100 | 100 |

3-(Difluoromethyl)-1-methyl-N-[(3R)-1,1,3-trimethyl-2,3-dihydroinden-4-yl]pyrazole-4-carboxamide is available from Sumitomo Chemical.

Morwet® D-425 was used as the source of sodium salt of naphthalene sulfonate condensate (Morwet is a registered trademark of and available from Nouryon Surface Chemistry LLC).

Kelzan® CC was used as the source of xanthan gum (Kelzan is a registered trademark of and available from CP Kelco).

Selvol® 24-203 was used as the source of 24% polyvinyl alcohol solution (Selvol is a registered trademark of and available from Sekisui Specialty Chemicals America, LLC).

Surfynol® 104 PG was used as the source of defoamer (Surfynol is a registered trademark of and available from Evonik Operations GMBH).

Kathon® CG/ICP was used as the source of a 1.15% 5-chloro-2-methyl-4-isothiazolin-3-one and 0.35% 2-methyl-4-isothiazolin-3-one solution in water (Kathon is a registered trademark of and available from Rohm and Haas Company).

Tersperse® 2500 was used as the source of 35% graft copolymer (Tersperse is a registered trademark of and available from Indorama Ventures Oxides LLC).

Stepfac™ TSP PE-K (CAS #163436-84-8) is polyoxyethylene tristyrylphenol phosphate, potassium salt and is available from Stepan Corp.

Michem® Lube 156P (CAS #proprietary) is used as the source of carnauba wax (25% emulsion in water) and is a registered trademark of and available from Michelman Inc.

Dur-O-Set® E-200 was used as the source of vinyl acetate ethylene copolymer emulsion (Dur-O-Set is a registered trademark of and available from Celanese International Corporation).

Method

Formulations of Table 1 were incubated at either 40 or 50 degrees Celsius and also subjected to 24-hour freeze thaw cycles for 2 weeks. Results can be seen in Table 2, below.

TABLE 2

| (microns) | I1 | I2 | I3 | I4 | I5 | I6 | I7 | I8 |
|---|---|---|---|---|---|---|---|---|
| Initial Particle Size | 2.63 | 2.58 | 2.61 | 2.57 | 2.49 | 2.55 | 2.61 | 2.53 |
| Particle Size after 40° C. for 8 weeks | — | 2.66 | 2.59 | 2.46 | 2.64 | 2.92 | 2.76 | 2.61 |
| d(0.5) after 50° C. for 4 weeks | 2.83 | 2.59 | 2.55 | 2.6 | 2.55 | 2.54 | 2.56 | 2.58 |
| d(0.5) after 50° C. for 8 weeks | — | 2.62 | 2.6 | 2.46 | 2.64 | 2.61 | 2.63 | 2.57 |
| d(0.5) after 2 weeks freeze/thaw | 3.41 | 2.68 | 2.9 | 2.73 | 2.72 | 2.62 | 2.61 | 2.64 | d(value) denotes volume median diameter where 50% of the distribution is above the value and 50% is below the value.

As seen in Table 2, formulations containing sodium salt of naphthalene sulfonate condensate prevented particle size growth.

Example 2—Stability of 3-(difluoromethyl)-1-methyl-N-[(3R)-1,1,3-trimethyl-2,3-dihydroinden-4-yl]pyrazole-4-carboxamide formulations

TABLE 3

| % w/w | I9 | I10 | I11 |
|---|---|---|---|
| 3-(difluoromethyl)-1-methyl-N-[(3R)-1,1,3-trimethyl-2,3-dihydroinden-4-yl]pyrazole-4-carboxamide | 32.4170 | 32.4170 | 32.4170 |
| Tristyrylphenol ethoxylated | 5.0 | 5.0 | 5.0 |
| Sodium salt of naphthalene sulfonate condensate | 3.0 | | |
| A lignin, alkali, reaction product with formaldehyde and sodium bisulfite | | 3.0 | |
| 35% graft copolymer | | | 3.0 |
| Propylene glycol | 7.5 | 7.5 | 7.5 |
| Silicone emulsion | 0.2 | 0.2 | 0.2 |
| 19.3% 1,2-benzisothiazolin-3-one | 0.24 | 0.24 | 0.24 |
| Xanthan gum | 0.2 | 0.2 | 0.2 |
| 5% Magnesium aluminum silicate | 0.4 | 0.4 | 0.4 |
| Water | 51.04 | 51.04 | 51.04 |
| Total | 100 | 100 | 100 |

Soprophor® FLK was used as the source of tristyrylphenol ethoxylated (Soprophor is a registered trademark of and available from Rhodia Chimie Societe Par Actions Simplifiee).

Reax® 907 was used as the source of a lignin, alkali, reaction product with formaldehyde and sodium bisulfite (Reax a registered trademark of and available from Huntsman Petrochemical Corporation).

Veegum® R was used as the source of magnesium aluminum silicate (Veegum is a registered trademark of and available from Vanderbilt Minerals, LLC).

Method

Formulations of Table 3 were incubated at either 40 or 54 degrees Celsius and also subjected to 24-hour freeze thaw cycles for 2 weeks. Results can be seen in Table 4, below.

TABLE 4

| (microns) | | I9 | I10 | I11 |
|---|---|---|---|---|
| d(0.1) | Initial | 0.800 | 0.855 | 0.861 |
| | 54° C. for 2 weeks | 0.886 | 1.076 | 1.227 |
| | 40° C. for 4 months | 0.867 | 0.977 | — |
| | Freeze/Thaw | 0.751 | 1.108 | 1.015 |
| d(0.5) | Initial | 2.058 | 2.031 | 2.092 |
| | 54° C. for 2 weeks | 2.123 | 2.763 | 4.077 |
| | 40° C. for 4 months | 2.046 | 2.269 | — |
| | Freeze/Thaw | 2.032 | 2.822 | 2.539 |

TABLE 4-continued

| (microns) | | I9 | I10 | I11 |
|---|---|---|---|---|
| d(0.9) | Initial | 4.741 | 4.252 | 4.437 |
| | 54° C. for 2 weeks | 4.549 | 6.669 | 13.178 |
| | 40° C. for 4 months | 4.854 | 5.239 | — |
| | Freeze/Thaw | 5.929 | 6.658 | 5.649 | d(value) denotes volume median diameter where 50% of the distribution is above the value and 50% is below the value.

As seen in Table 4, above, formulations containing sodium salt of naphthalene sulfonate condensate prevented particle size growth.

Example 3—Stability of further 3-(difluoromethyl)-1-methyl-N-[(3R)-1,1,3-trimethyl-2,3-dihydroinden-4-yl]pyrazole-4-carboxamide formulations

TABLE 5

| % w/w | I12 | I13 | I14 | I15 | I16 |
|---|---|---|---|---|---|
| 3-(difluoromethyl)-1-methyl-N-[(3R)-1,1,3-trimethyl-2,3-dihydroinden-4-yl]pyrazole-4-carboxamide | 34.05 | 34.05 | 34.05 | 34.05 | 34.05 |
| Glycerol | 8.00 | 8.00 | 8.00 | 8.00 | 8.00 |
| 24% polyvinyl alcohol solution | 2.00 | — | — | — | — |
| 9% polyvinyl alcohol solution | — | — | 2.00 | 5.30 | — |
| 70% Sorbitol Solution | 5.25 | 5.25 | 5.25 | 5.25 | 5.25 |
| Sodium salt of naphthalene sulfonate condensate | 1.25 | 1.25 | 1.25 | 1.25 | 1.25 |
| Polyoxyethylene tristyrylphenol phosphate, potassium salt | 0.65 | 0.65 | 0.65 | 0.65 | 0.65 |
| Defoamer | 0.065 | 0.065 | 0.065 | 0.065 | 0.065 |
| 25% Carnauba wax emulsion | 2.40 | 2.40 | 2.40 | 2.40 | 2.40 |
| Vinyl acetate ethylene copolymer emulsion | 3.00 | 3.00 | 3.00 | 3.00 | 3.00 |
| Xanthan gum | 0.16 | 0.16 | 0.16 | 0.16 | 0.18 |
| 19.3% 1,2-benzisothiazolin-3-one | 0.24 | 0.24 | 0.24 | 0.24 | 0.24 |
| Water | 42.935 | 43.915 | 42.935 | 39.635 | 44.914 |
| Total | 100 | 100 | 100 | 100 | 100 |

Selvol® 09-523 was used as the source of 9% polyvinyl alcohol solution (Selvol is a registered trademark of and available from Sekisui Specialty Chemicals America, LLC).

Proxel® GXL was used as the source of 19.3% 1,2-benzisothiazolin-3-one (Proxel is a registered trademark of Arch UK Biocides and is available from Lonza).

Method

Formulations of Table 5, above, were incubated at either 0, 4, 25, 40, 50 or 54 degrees Celsius for 2 to 52 weeks and also subjected to 24-hour freeze thaw cycles for 5 cycles. Results can be seen in Table 6, below.

TABLE 6

| d(0.5) microns | I12 | I13 | I14 | I15 | I16 |
|---|---|---|---|---|---|
| Initial | 1.924 | 2.07 | 2.11 | 2.09 | 2.027 |
| Freeze/Thaw | 2.048 | 2.24 | 2.27 | 2.19 | 2.266 |
| 54° C. for 2 weeks | 2.217 | 2.35 | 2.36 | 2.33 | 2.396 |
| 50° C. for 4 weeks | 2.174 | 2.31 | 2.26 | 2.22 | 2.394 |
| 0° C. for 8 weeks | 1.864 | 2.09 | 2.07 | 2.16 | 2.067 |
| 40° C. for 8 weeks | 2.113 | 2.37 | 2.3 | 2.32 | 2.428 |
| 50° C. for 8 weeks | 2.185 | 2.27 | 2.24 | 2.26 | 2.371 |
| 4° C. for 16 weeks | 2.063 | 2.03 | 2.06 | 1.96 | 2.173 |
| 40° C. for 16 weeks | 1.801 | 2.25 | 2.26 | 2.51 | 2.385 |
| 25° C. for 52 weeks | 2.012 | 2.15 | 2.12 | 2.19 | 2.18 | d(value) denotes volume median diameter where 50% of the distribution is above the value and 50% is below the value.

As seen in Table 6, above, formulations of the present invention prevented particle size growth.

Example 4—Stability of Agricultural Formulations of the Present Invention

TABLE 7

|  | C1 | C2 | C3 | C4 |
|---|---|---|---|---|
| 99.5% Ethaboxam | 2.362 | 2.362 | 2.362 | 2.362 |
| 98.54% Metalaxyl | 1.269 | 1.269 | 1.269 | 1.269 |
| 93% Mandestrobin | 3.366 | 3.366 | 3.366 | 3.366 |
| Methyloxirane polymer | 0.065 | 0.065 | 0.065 | 0.065 |
| Sodium salt of naphthalene sulfonate condensate | 0.262 | 0.262 | 1.262 | 1.262 |
| Sodium salt of alkyl vinyl ether/maleic acid half-ester copolymer and polyvinyl pyrrolidone | 0.065 | 0.065 | 0.065 | 0.065 |
| Polyoxyethylene tristyrylphenol phosphate, potassium salt | 3.0 | 2.0 | 1.0 | 3.0 |
| Alkylphenol ethoxylate free nonionic wetter and dispersant package | — | 1.0 | 1.0 | — |
| Colorant dispersion | 7.33 | 7.33 | 7.33 | 7.33 |
| 25% Carnauba was emulsion | 2.5 | 2.5 | 2.5 | 2.5 |
| Silicone emulsion | 0.026 | 0.026 | 0.026 | 0.026 |
| Xanthan gum | 0.300 | 0.300 | 0.300 | 0.300 |
| 19.3% 1,2-benzisothiazolin-3-one | 0.24 | 0.24 | 0.24 | 0.24 |
| Propylene glycol | 34.041 | 34.041 | 34.041 | 34.041 |
| Water | 45.174 | 45.174 | 45.174 | 44.174 |

Ethaboxam TG was used as the source of ethaboxam and is available from Sumitomo Chemical.

Metalaxyl TG was used as the source for metalaxyl and is available from Nufarm Americas, Inc.

Pluronic® P-104 was used as the source of methyloxirane polymer (Pluronic is a registered trademark of and available from BASF Corporation).

Easy-Sperse® P-20 was used as the source of mixture of sodium salt of alkyl vinyl ether/maleic acid half-ester copolymer and polyvinyl pyrrolidone (Easy-Sperse is a registered trademark of ISP Investments, Inc. and is available from Ashland).

Tersperse® 4894 was used as the source of alkylphenol ethoxylate free nonionic wetter and dispersant package (Tersperse is a registered trademark of and available from Indorama Ventures Oxides LLC).

Xiameter® AFE-0010 was used the source of silicone emulsion (Xiameter is a registered trademark of and available from Dow Corning Corporation).

Aquence® producer BG 0271 was used as the source of an ethylene-vinyl acetate copolymer in water (Aquence is a registered trademark of and available from Henkel AG & Co. KGaA).

Method

Formulations C1-C4 of Table 7, above, were mixed with formulation I16 of Table 5, above, at a ratio of 95.59% to 4.41% by weight or 300 to 13 by volume, followed by incubating at 40, 50 and 54 degrees Celsius and also subjected to 24-hour freeze thaw cycles for 2 weeks.

Results

Formulations C1-C3 formed crystals upon storage. However, formulation C4 did not form crystals upon storage.

What is claimed is:

1. A stable agricultural formulation comprising of 3-(difluoromethyl)-1-methyl-N-[(3R)-1,1,3-trimethyl-2,3-dihydroinden-4-yl]pyrazole-4-carboxamide, ethaboxam, metalaxyl, mandestrobin, methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt, wherein the concentration ratio of methyloxirane polymer, sodium salt of naphthalene sulfonate condensate, a mixture of sodium salt of alkyl vinyl ether/maleic acid half-ester copolymer and polyvinyl pyrrolidone and polyoxyethylene tristyrylphenol phosphate, potassium salt is from about 1:19:1:46.

2. A stable agricultural formulation comprising 3-(difluoromethyl)-1-methyl-N-[(3R)-1,1,3-trimethyl-2,3-dihydroinden-4-yl]pyrazole-4-carboxamide at a concentration of about 1.5% w/w, ethaboxam at a concentration of about 2.2% w/w, metalaxyl at a concentration of about 1.2% w/w, mandestrobin at a concentration of about 2.9% w/w, methyloxirane polymer at a concentration of about 0.06% w/w, sodium salt of naphthalene sulfonate condensate at a concentration of about 1.3% w/w, a mixture of sodium salt of alkyl vinyl ether/maleic acid half-ester copolymer and polyvinyl pyrrolidone at a concentration of about 0.06% w/w and polyoxyethylene tristyrylphenol phosphate, potassium salt at a concentration of about 2.9% w/w.

3. The formulation of claim 1, further comprising one or more excipients selected from the group consisting of 24% polyvinyl alcohol solution, glycerol, 70% sorbitol solution, a defoamer, an ethylene-vinyl acetate copolymer, a 25% carnauba wax emulsion, silicone emulsion, xanthan gum, 19.3% 1, 2-benzisothiazolin-3-one and propylene glycol.

4. A method of protecting plants comprising treating plant propagation material with a fungicidally effective amount of the product of claim 1.

5. A method for controlling or reducing pest damage of plants comprising applying to the plant propagation material an effective amount of the product of claim 1.

6. The formulation of claim 2, further comprising one or more excipients selected from the group consisting of 24% polyvinyl alcohol solution, glycerol, 70% sorbitol solution, a defoamer, an ethylene-vinyl acetate copolymer, a 25% carnauba wax emulsion, silicone emulsion, xanthan gum, 19.3% 1, 2-benzisothiazolin-3-one and propylene glycol.

* * * * *